July 1, 1924.

G. H. FRASER

FLUID CURRENT SEPARATOR

Original Filed May 21, 1915

1,499,725

INVENTOR
George Holt Fraser

Patented July 1, 1924.

1,499,725

UNITED STATES PATENT OFFICE.

GEORGE HOLT FRASER, OF BROOKLYN, NEW YORK.

FLUID-CURRENT SEPARATOR.

Original application filed May 21, 1915, Serial No. 29,705. Divided and this application filed October 14, 1922. Serial No. 594,516.

*To all whom it may concern:*

Be it known that I, GEORGE HOLT FRASER, a citizen of the United States, residing in the borough of Brooklyn, county of Kings, city and State of New York, have invented certain new and useful Improvements in Fluid-Current Separators, being a refiling of my renewal application, Serial Number 544,973, filed March 16, 1922, of my divisional application, Serial Number 235,914, filed May 22, 1918, of my original application, Serial Number 29,705, filed May 21, 1915, of which the following is a specification.

This invention relates to separators for extracting solids from fluid currents, and aims to provide improvements therein.

Air separators for extracting floating dust from air belong to this class, and usually comprise a rotary or other distributor for finely divided material, a casing comprising feed and dust chambers, means for causing a fluid current to traverse the descending material from the feed to the dust chamber for floating out and separating the fine dust, and suitable outlets.

My invention aims to provide for a better separation of the finer material, selection or grading of the products, compactness and convenience in construction, and better current regulation, in such devices.

To this end in carrying out the preferred embodiment of my present improvements I provide an improved adjustable feeder, an improved distributor, and improved selector beyond the distributor, a precipitating chamber beyond the selector, a filter or fine dust extractor succeeding the precipitating and selecting chambers, a current conduit or passage in which said parts are successively disposed, means for causing a fluid current to flow through said passage, means for adjusting such current, and separate coarse and fine outlets for the different grades of material.

These improvements may be embodied in either a direct or a radiating current separator, and in one having either an inside or an outside fan or blower for producing the current, but in the preferred form of my invention I provide an improved construction for utilizing an inside blower, all as will be hereinafter more fully set forth.

In the accompanying drawings, which illustrate the preferred adaptation of my improvements as applied to air separators.

Figure 1:
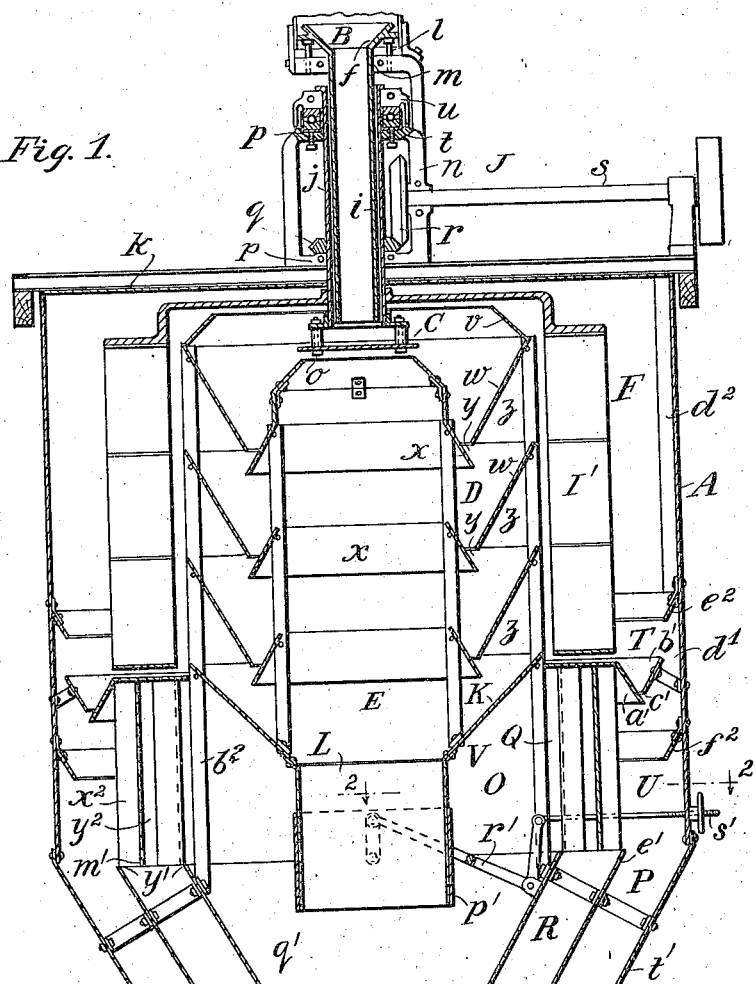
Figure 2:
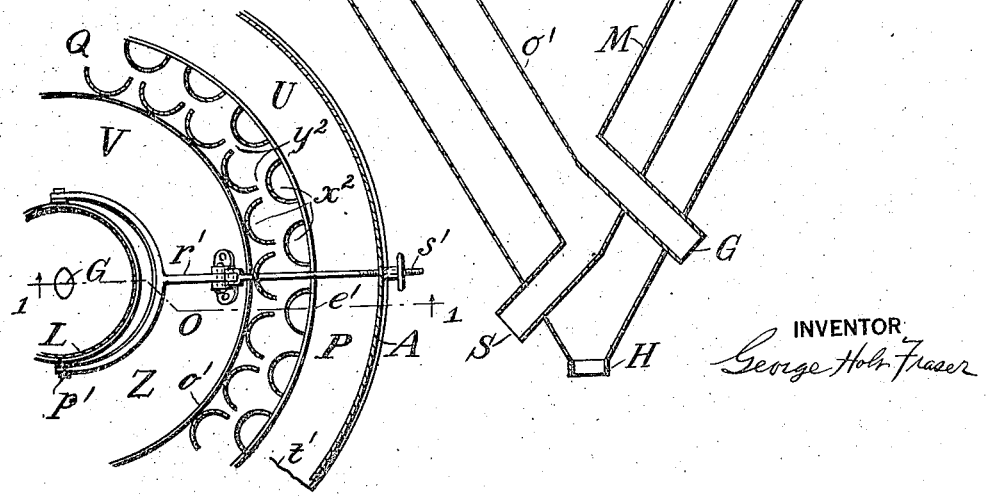

Fig. 1 is a vertical axial section, of an inside blower separator showing the preferred form of my improvements, the view being cut approximately on the lines 1—1 in Fig. 2, and looking in the direction of the arrow, and Fig. 2 is a fragmentary section thereof cut on the plane of the line 2—2 in Fig. 1 and looking in the direction of the arrow.

Referring to the drawings let A indicate the main frame or casing of an air separator, B the feed inlet, C the feeder, D the distributor, E the feed chamber, F the dust chamber, G the coarse outlet, H the fine outlet, I' the fan or blower, and J the driving mechanism.

These parts may be of any usual or suitable construction which will serve to distribute finely divided material and cause a fluid current to flow through the material as it descends so as to permit the fines to be floated into the dust chamber while the tailings fall through the feed chamber. The casing is usually a sheet metal cylinder enclosing the necessary cones, walls and pipes to provide suitable conduits, passages and chambers for the currents and products desired. The inlet usually comprises a hopper for connection with a source of supply of pulverulent material. The feeder is generally a revolving disc. The distributor usually comprises means for causing the material to descend in a thin wide stream in the feed chamber. The blower is usually situated inside of the casing and constructed to cause a current to flow from the feed chamber through the descending material and into the dust chamber in an endless circuit. The fine outlet receives and discharges material precipitated in the dust chamber.

Referring to Figs. 1 and 2 I will now describe in detail the preferred adaptation of my improvements as shown therein as applied to an inside blower separator.

The feed hopper $f$ has a feed pipe $i$ extending axially of the separator through the tubular drive shaft $j$ and top wall $k$ thereof into the feed chamber E, and opening opposite the feeder disc C, toward and from which it is adjustable to control speed of flow by screws $l$. It slides in a guideway $m$, which is divided so that it can be clamped in position when set and can be easily loosened for adjustment or freed for removal.

It is removably mounted on the driving frame or bracket $n$ which supports the feed pipe, feeder and driving mechanism.

The feeder C is an adjustable revolving disc carried by bolts $o$ from the flanged lower end of the tubular shaft $j$ within the chamber E, which shaft extends upwardly upon the feed pipe $i$ and has upper and lower bearings $p$ for guiding and supporting it, intermediate of which it is driven, as by a bevelled gear $q$ keyed to the shaft and meshing with a bevelled gear $r$ on the shaft $s$.

The bracket $n$ is open-sided and has split bearings, so that the driving shaft can be removed. The bearings $p$ preferably comprise a U-shaped or grooved cupped ring $t$ removably and adjustably seated in the bracket $n$ and containing balls and races which run in oil in the cupped ring, which is high enough to preserve the desired oil level, and constructed to make a dust joint with the tubular shaft and its gear at the lower bearing and with this shaft and its supporting collar $u$ at the upper bearing.

The distributor D preferably consists of a series of inclined members adapted to receive the material from the feeder and cause it to fall in a wide thin stream. When the material is to surround the feed chamber the distributor members are annular rings, and when its speed of descent is to be controlled these comprise alternately reversely inclined spaced rings which will intercept, distribute, collect and again distribute the material as it descends so as to cause it to follow a zig-zag downward course and retard it so that it will form a slowly descending wall or envelope surrounding the feed chamber. As shown the distributor comprises an impact or deflector baffle ring $v$, outer converging or receiving rings $w$, and inner retarding and distributing rings or dams $x$ arranged concentrically and forming a substantially cylindrical cage or distributor having narrow feeding passages $y$ between the rings $w$ and $x$, and wide air passages $z$ between successive pairs of these rings, so that the material will fall from step to step and the air current will flow out between each step in a series of upwardly inclined but substantially horizontal flowing streams isolated by the respective rings, and will thereby float out with it all material fine enough to be carried by the current toward the dust chamber.

Tailings from the distributor will fall onto an upper receptacle or cone K and descend through its lower opening or pipe L to a lower receptacle or coarse outlet cone M.

The dust and air will descend from the dust chamber F, and the air will flow through the return passage O which communicates with the pipe L so that the current may circulate continuously through these and the dust and feed chambers to provide an endless circuit so that the air may be used over and over. Dust coarse enough to precipitate in the dust chamber will fall in the dust cone P and flow to the outlet H.

One feature of my improvements provides for making a separation of the fine material reaching the dust chamber to an excessively fine product, as well as extracting all of the floating material from the current, and this I preferably accomplish by providing filtering or extracting means Q between the dust chamber and the return passage O, and a supplemental or intermediate collector or powder chamber R for the product extracted, and a separate extraction outlet S therefor. The filter Q is preferably a pervious or foraminous construction, and is shown as a plurality of rows of vertically arranged hollow sided troughs or semi-tubes, one row within the other, and disposed so that the follow face or a trough of the inner row is opposite the space between adjacent edges of two outer troughs, so that current passing between these will form voids, or dead spaces opposite their faces, in which flowing material may settle and descend to the chamber R without danger of being again taken up by the current.

These tubes are preferably vertical or slightly inclined outwardly at their lower ends so that material descending therein may slide down them instead of falling outwardly into the current. The tubes extend from the underside of the wall K to or into the chamber R so as to guide their precipitates past any existing current and deposit them in the calm within this chamber. They constitute a foraminous wall separating the dust chamber from the return chamber, and will be adapted to extract particles of the fineness desired from the return current or to clean the return air, and the proportioning and location of adjacent parts will be adapted to permit precipitation of lumps of predetermined coarseness outside of the filter so that the extraction in the latter will be only of the fineness desired. As shown in the construction in Fig. 1 the extraction chamber has an outer wall $e'$ rising above the bottom of the dust chamber to provide a pocket or guard at the lower part of the latter for protection against ingress of coarse particles or upward current from below it.

My invention preferably provides for subdividing the dust chamber and downwardly directing its solid contents in an annular blanket and its fluid contents in an annular current outwardly thereof. This is preferably accomplished by a divider or dam T which is shown as an outwardly inclined ring or plate $a'$ surrounded by a reversely inclined ring or plate $b'$ said rings being spaced apart at their adjacent edges sufficiently to provide a dust passage $c'$ for directing outwardly the dust in the chamber F into the precipitating chamber U. The ring $a'$ is opposite the wall K, and directs the dust outwardly therefrom, while the ring $b'$ is spaced apart from the casing S to provide between its outer side and the casing an annular current passage $d'$ down which the air from the chamber can flow freely, so as to bring the air at the outer side of the descending dust. Below the divider this outer air flows slowly inwardly toward the filter Q, thus giving it a reverse inward action adapted to float particles of the desired fineness into the filter while permitting larger material to precipitate. Whirl checks $d^2$, dust guards $e^2$, and air chutes $f^2$ are provided. The ring $a'$ is concentric of and surrounds and encloses the upper ends of the filter troughs above the return passage, and comprises a flat part or plate above and covering the troughs which serves to seal their upper ends and prevent downward leakage of material and resist downward flow of current relatively to them. The wall $e'$ surrounds and encloses the lower ends of the troughs and resists upward flow of current relatively to them. The opposite edges of the wall $e'$ and the ring $a'$ determine the space through which current may flow inwardly toward the filter.

According to another feature of my invention I provide an inside blower as the current producing means and means for connecting the suction of this blower with the return chamber or passage O inwardly of the dust, precipitation, and extraction, chambers. This is preferably accomplished as shown in Figs. 1 and 2 by providing an annular exhaust chamber V inwardly of the precipitation and extraction chambers, surrounding the tailings pipe L.

My invention comprises a fixed tailings chamber which preferably consists of an annular or conical chamber Z under the suction chamber V. The current flows into the chamber Z from which it overflows under the lower end of the pipe L into the feed chamber E. The bottom wall $o'$ of the chamber Z has an open upper edge $y'$ and extends from the wall $m'$ downwardly and ends in or forms part of the tailings outlet G, which may be closed with an automatic or guard valve to prevent current overflow.

The various extractions will flow down outside of the current chambers, and the coarse tailings pass centrally through them, the incoming air rising through the falling tailings.

My invention provides improved means for regulating the current, preferably consisting in a valve $p'$ on the outlet L and adapted to be raised or lowered to diminish the air passage $q'$ under this pipe, thus avoiding disturbance of relation of any of the other parts while permitting suitable current regulation. The valve $p'$ is shown as partially surrounded by, suspended from, and sustained and adjusted by a lever $r'$ operated by a rod $s'$ which crosses the filter horizontally, and extends through and is adjusted from without the casing.

The several parts are suitably supported, the distributor rings being supported from their remote edges by posts $b^2$ to permit an uninterrupted annular space between their adjacent edges.

In operation the feeder and blower may be connected to drive together at any relative speed, or operated independently. Speed of feed will be adjusted by adjusting the hopper, and speed of current by varying the speed of the fan or the valve $p'$. Products of the desired grades being obtained the separator will continue uniform work without subsequent adjustment.

While as shown in Fig. 1 my improvements are shown as utilized with an inside blower, the fan I' surrounding the distributor inwardly of the dust chamber, and the valve $p'$ permitting the coarse cone M to be fixed relatively to the filter Q, it will be understood that they may be used with other types of separators.

To prevent centrifugal or whirling currents in the dust chamber and aid in extracting floating dust therein vertical whirl checks $d^2$ are preferably provided on its outer wall as shown, and to project dust descending on this wall into the trough of the divider dust guards or deflectors $e^2$ are fastened on this wall sufficiently above the air passage to permit current to flow underneath them around the divider T, and sufficiently close to the latter to project descending dust through this current into the trough.

Below the divider for operating inwardly the external current air chutes or deflectors $f^2$ are preferably provided on the inner wall, so that this descending current will first go outwardly around the divider and then be converged inwardly toward the descending stream or envelope of dust to float the finest thereof toward the extractor or return chamber. These parts may be fixed or adjustable and multiplied to suit circumstances.

It will be seen that my invention provides improvements which can be readily and advantageously availed of in whole or in part, and it will be understood that the invention is not limited to the particular details of construction, arrangement and combination of parts set forth as constituting its preferred embodiment, since it can be used in whole or in part according to such modifications of these as circumstances or the judgment of those skilled in the art may dictate, without departing from the spirit of the invention.

Claims:

1. In combination, a casing, means for distributing material therein, means therein for generating a fluid current, means for causing such current to traverse such material, means affording a precipitation chamber for receiving such current, means affording a return current passage from said chamber, an extractor between said chamber and said passage for extracting floating material from the current flowing from said chamber comprising a foraminous partition constituting a wall of said chamber, an outer wall for said chamber, two spaced walls below said extractor spaced apart from said outer wall, terminating at their upper edges below and affording a way above them for said current passage, and affording a conduit between them out of the path of said current for precipitate from said extractor, means affording a coarse outlet below said distributor, and means affording a precipitate outlet below said chamber.

2. In combination, a casing enclosing a chamber, an upper receptacle mounted in said casing and having upper and lower openings communicating with said chamber, a lower receptacle in said casing and having an open upper end spaced apart from said upper receptacle and affording between said receptacles a return current passage communicating between said chamber and said lower opening, means within said casing for causing a fluid current to flow through said upper opening into said chamber and return through said passage to said lower opening, means for feeding material to be separated to said upper receptacle, foraminous extracting means surrounding the space between said receptacles for extracting floating material from the current flowing from said chamber to said lower opening affording an inward current passage to the latter, and means within said casing below said return current passage and surrounding said extracting means for resisting flow of current to the latter below said passage.

3. In combination, a casing enclosing a chamber, an upper receptacle mounted in said casing and having upper and lower openings communicating with said chamber, a lower receptacle in said casing and having an open upper end spaced apart from said upper receptacle and affording between said receptacles a return current passage communicating between said chamber and said lower opening, means within said casing for causing a fluid current to flow through said upper opening into said chamber and return through said passage to said lower opening, means for feeding material to be separated to said upper receptacle, foraminous extracting means surrounding the space between said receptacles for extracting floating material from the current flowing from said chamber to said lower opening affording an inward current passage to the latter, and stationary means below said return current passage and inwardly of said extracting means for resisting upflow of current inwardly of them.

4. In combination, a casing enclosing a chamber, an upper receptacle mounted in said casing and having upper and lower openings communicating with said chamber, a lower receptacle in said casing and having an open upper part spaced apart from said upper receptacle and affording between said receptacles a return current passage communicating between said chamber and said lower opening, means within said casing for causing a fluid current to flow through said upper opening into said chamber and return through said passage to said lower opening, means for feeding material to be separated to said upper receptacle, foraminous extracting means surrounding the space between said receptacles for extracting floating material from the current flowing from said chamber to said lower opening affording an inward current passage to the latter, and stationary current resisting means below said return current passage and concentric of said extracting means for resisting flow of current through the latter below said passage.

5. In combination, a casing enclosing a chamber, an upper receptacle mounted in said casing and having upper and lower openings communicating with said chamber, a lower receptacle in said casing and having an open upper part spaced apart from said upper receptacle and affording between said receptacles a return current passage communicating between said chamber and said lower opening, means within said casing for causing a fluid current to flow through said upper opening into said chamber and return through said passage to said lower opening, means for feeding material to be separated to said upper receptacle, foraminous extracting means surrounding the space between said receptacles for extracting floating material from the current flowing from said chamber to said lower opening affording an inward current passage to the latter, and stationary current resisting means below said foraminous means for resisting flow of current beneath the latter.

6. In combination, a casing enclosing a chamber, an upper receptacle mounted in said casing and having upper and lower openings communicating with said chamber, a lower receptacle in said casing and having an open upper part spaced apart from said upper receptacle and affording between said receptacles a return current passage communicating between said chamber and said lower opening, means within said casing for causing a fluid current to flow through said upper opening into said chamber and return through said passage to said lower opening, means for feeding material to be separated to said upper receptacle, foraminous extracting means surrounding the space between said receptacles for extracting floating material from the current flowing from said chamber to said lower opening affording an inward current passage to the latter, and means without said upper receptacle and above said extracting means for resisting downflow of current therethrough.

7. In combination, a casing enclosing a chamber, an upper receptacle mounted in said casing and having upper and lower openings communicating with said chamber, a lower receptacle in said casing and having an open upper end spaced apart from said upper receptacle and affording between said receptacles a return current passage communicating between said chamber and said lower opening, means within said casing for causing a fluid current to flow through said upper opening into said chamber and return through said passage to said lower opening, means for feeding material to be separated to said upper receptacle, foraminous extracting means surrounding the space between said receptacles for extracting floating material from the current flowing from said chamber to said lower opening affording an inward current passage to the latter, and means surrounding the upper part of said extracting means for resisting flow of current to the upper part thereof.

8. In combination, a casing enclosing a chamber, an upper receptacle mounted in said casing and having upper and lower openings communicating with said chamber, a lower receptacle in said casing and having an open upper end spaced apart from said upper receptacle and affording between said receptacles a return current passage communicating between said chamber and said lower opening, means within said casing for causing a fluid current to flow through said upper opening into said chamber and return through said passage to said lower opening, means for feeding material to be separated to said upper receptacle, foraminous extracting means surrounding the space between said receptacles for extracting floating material from the current flowing from said chamber to said lower opening affording an inward current passage to the latter, and means surrounding said upper receptacle above and concentric of the upper part of said extracting means for resisting flow of current through the upper part thereof.

9. In combination, a casing enclosing a a chamber, an upper receptacle mounted in said casing and having upper and lower openings communicating with said chamber, a lower receptacle in said casing and having an open upper end spaced apart from said upper receptacle and affording between said receptacles a return current passage communicating between said chamber and said lower opening, means within said casing for causing a fluid current to flow through said upper opening into said chamber and return through said passage to said lower opening, means for feeding material to be separated to said upper receptacle, foraminous extracting means surrounding the space between said receptacles for extracting floating material from the current flowing from said chamber to said lower opening affording an inward current passage to the latter, and covering means without said upper receptacle and above said return current passage covering the upper part of said extracting means.

10. In combination, a casing enclosing a chamber, a receptacle mounted in said casing and having upper and lower openings communicating with said chamber and affording a current passage through said receptacle and upper opening into said chamber and a return current passage from said chamber through said lower opening, means for supplying material to be separated to said receptacle, means within said casing for causing a fluid current to flow through and around said receptacle, foraminous means surrounding said receptacle for intercepting particles floating in such current comprising vertically extending faces in the path of and opposed to such current affording downward ways for conducting intercepted material out of the zone of such current and affording intermediate of such faces inward apertures affording inward current passages from said chamber to said lower opening, and leak resisting means surrounding said receptacle for resisting leakage around said receptacle vertically of said faces.

11. In combination, a casing enclosing a chamber, an upper receptacle mounted in said casing and having upper and lower openings communicating with said chamber, a stationary lower receptacle in said casing affording a space between said receptacles and having an open upper part affording communication between said chamber and said lower opening, means for supplying material to be separated to said upper receptacle, means within said casing for causing a fluid current to flow through said upper receptacle and upper opening into said chamber and return between said receptacles to said lower opening, foraminous means surrounding the space between said receptacles for intercepting particles floating in such current toward said lower opening comprising downwardly extending faces in the path of and opposed to such current affording downward ways for conducting intercepted particles out of the zone of such current and affording between such faces inward passages for such current, and movable means concentric of and movable relatively to said fixed receptacle for varying the space through which such current is permitted to flow.

12. In combination, a casing enclosing a chamber, an upper receptacle mounted in said casing and having an upper opening communicating with said chamber, and having a contracted lower portion having a lower opening communicating with said chamber, a lower receptacle below said lower opening and having an open upper end below and spaced apart from said upper receptacle and affording a space between said receptacles affording a current passage communicating between said chamber and said lower opening, means for supplying material to be separated to said upper receptacle, means within said casing for causing a fluid current to flow through said upper receptacle and upper opening into said chamber and return between said receptacles to said lower opening, and means in the space between said receptacles and below the contracted lower portion of said upper receptacle and around said lower opening for varying the space between said receptacles through which such current is permitted to flow.

13. In combination, a casing enclosing a chamber, an upper receptacle mounted in said casing and having an upper opening communicating with said chamber, and having a contracted lower portion having a lower opening communicating with said chamber, a lower receptacle below said lower opening and having an open upper end below and spaced apart from said upper receptacle and affording a space between said receptacles affording a current passage communicating between said chamber and said lower opening, means for supplying material to be separated to said upper receptacle, means within said casing for causing a fluid current to flow through said upper receptacle and upper opening into said chamber and return between said receptacles to said lower opening, and means in the space between said receptacles and mounted on the contracted lower portion of said upper receptacle for varying the space through which such current is permitted to flow.

14. In combination, a casing enclosing a chamber, an upper receptacle mounted in said casing and having an upper opening communicating with said chamber, and having a contracted lower portion having a lower opening communicating with said chamber, a lower receptacle below said lower opening and having an open upper end below and spaced apart from said upper receptacle and affording a space between said receptacles affording a current passage communicating between said chamber and said lower opening, means for supplying material to be separated to said upper receptacle, means within said casing for causing a fluid current to flow through said upper receptacle and upper opening into said chamber and return between said receptacles to said lower opening, and means in the space between said receptacles and depending below the contracted lower portion of said upper receptacle for varying the space between said receptacles through which such current is permitted to flow.

15. In combination, a casing enclosing a chamber, an upper receptacle mounted in said casing and having an upper opening communicating with said chamber, and having a contracted lower portion having a lower opening communicating with said chamber, a lower receptacle below said lower opening and having an open upper end below and spaced apart from said upper receptacle and affording a space between said receptacles affording a current passage communicating between said chamber and said lower opening, means for supplying material to be separated to said upper receptacle, means within said casing for causing a fluid current to flow through said upper receptacle and upper opening into said chamber and return between said receptacles to said lower opening, and means in the space between said receptacles and below the contracted portion of said upper receptacle and around said lower opening and sustained from said lower receptacle for varying the space between said receptacles through which such current is permitted to flow.

16. In combination, a casing enclosing a chamber, an upper receptacle mounted in said casing and having an upper opening communicating with said chamber, and having a contracted lower portion having a lower opening communicating with said chamber, a lower receptacle below said lower opening and having an open upper end below and spaced apart from said upper receptacle and affording a space between said receptacles affording a current passage communicating between said chamber and said lower opening, means for supplying material to be separated to said upper receptacle, means within said casing for causing a fluid current to flow through said upper receptacle and upper opening into said chamber and return between said receptacles to said lower opening, and movable means in the space between said receptacles and below the contracted lower portion of said upper receptacle and above said lower receptacle movably mounted relatively to said receptacles for varying the space between said receptacles through which such current is permitted to flow.

17. In combination, a casing enclosing a chamber, an upper receptacle mounted in said casing and having an upper opening communicating with said chamber and having a tapering lower portion having a lower opening communicating with said chamber, a lower receptacle mounted in said chamber and having an open upper end below and spaced apart from said upper receptacle and affording between said receptacles a space affording communication between said chamber and said lower opening, means for supplying material to be separated to said upper receptacle, means within said casing for causing a fluid current to flow through said upper receptacle and upper opening into said chamber and return between said receptacles to said lower opening, means affording a wall surrounding the tapering lower portion of said upper receptacle, and means below said wall and beneath said tapering lower portion of said upper receptacle and around said lower opening and in the space between said receptacles for varying the space between said receptacles through which such current is permitted to flow.

18. In combination, a casing enclosing a chamber, an upper receptacle mounted in said casing and having an upper opening communicating with said chamber and having a tapering lower portion having a lower opening communicating with said chamber, a lower receptacle mounted in said chamber and having an open upper end below and spaced apart from said upper receptacle and affording between said receptacles a space affording communication between said chamber and said lower opening, means for supplying material to be separated to said upper receptacle, means within said casing for causing a fluid current to flow through said upper receptacle and upper opening into said chamber and return between said receptacles to said lower opening, means affording a wall surrounding the tapering lower portion of said upper receptacle, and means within said wall and beneath the tapering lower portion of said upper receptacle and around said lower opening and in the space between said receptacles for varying the space between such receptacles through which such current is permitted to flow.

19. In combination, a casing enclosing a chamber, an upper receptacle mounted in said casing and having an upper opening communicating with said chamber and having a tapering lower portion having a lower opening communicating with said chamber, a lower receptacle mounted in said chamber and having an open upper end below and spaced apart from said upper receptacle and affording between said receptacles a space affording communication between said chamber and said lower opening, means for supplying material to be separated to said upper receptacle, means within said casing for causing a fluid current to flow through said upper receptacle and upper opening into said chamber and return between said receptacles to said lower opening, means affording a wall surrounding the tapering lower portion of said upper receptacle, and movable means beneath said tapering lower portion and inwardly of said wall and in the space between said receptacles movable relatively to said receptacles to vary the space between said receptacles through which such current is permitted to flow.

20. In combination, a casing enclosing a chamber, an upper receptacle mounted in said casing and having an upper opening communicating with said chamber and having a tapering lower portion having a lower opening communicating with said chamber, a lower receptacle mounted in said casing and having an open upper end below and spaced apart from said upper receptacle and affording between said receptacles a space affording communication between said chamber and said lower opening, means for supplying material to be separated to said upper receptacle, means within said casing for causing a fluid current to flow through said upper receptacle and upper opening into said chamber and return between said receptacles to said lower opening, and foraminous means in the space between said receptacles around said lower tapering portion and around said lower opening affording apertures between said receptacles through which such current is permitted to flow.

21. In combination, a casing enclosing a chamber, an upper receptacle mounted in said casing and having an upper opening communicating with said chamber and having a tapering portion having a lower opening communicating with said chamber, a lower receptacle mounted in said casing and having an open upper end below and spaced apart from said upper receptacle and affording between said receptacles a space affording communication between said chamber and said lower opening, means for supplying material to be separated to said upper receptacle, means within said casing for causing a fluid current to flow through said upper receptacle and upper opening into said chamber and return between said receptacles to said lower opening, means below and around said lower opening and in the space between said receptacles affording apertures affording communication through such space between said chamber and said lower opening, and means between said receptacles for varying the space through which such current is permitted to flow.

22. In combination, a casing enclosing a chamber, an upper receptacle mounted in said casing and having an upper opening communicating with said chamber and having a contracted lower portion having a lower opening communicating with said chamber, a lower receptacle mounted in said casing and having an open upper end below and spaced apart from said upper receptacle and affording between said receptacles a space affording communication between said chamber and said lower opening, means for supplying material to be separated to said upper receptacle, means within said casing for causing a fluid current to flow through said upper receptacle and upper opening into said chamber and return between said receptacles to said lower opening, means below the contracted lower portion of said upper receptacle and above said lower receptacle and across the space between said receptacles affording spaces through which such current is permitted to flow from said chamber to said lower opening, and means in the space between said receptacles and below said lower opening for varying the space through which such current is permitted to flow.

23. In combination, a casing, means for distributing material therein, means therein for generating a fluid current, means for causing such current to flow therein through such material, means affording a chamber beyond said distributing means, means affording a chamber beyond said chamber, means between said chambers for causing dust settling in the former chamber to flow in a wide thin stream through an intermediate part of the latter chamber, and means for causing said current to again traverse said material in the latter chamber.

24. In combination, a casing, means for distributing material therein, means therein for generating a current, means for causing such current to flow through such material, means affording a dust chamber beyond said distributing means, means affording a second chamber below said chamber, means between said chambers receiving material from said first chamber and precipitating it into said second chamber intermediate of the walls thereof, and means affording a current passage communicating from said first chamber to said second chamber beyond said receiving means for causing current from said first chamber to flow into said second chamber beyond said precipitated material.

25. In combination, a casing enclosing a chamber, means therein for generating a fluid current, an upper receptacle supported within the chamber in spaced relation to said casing and having an open top and an open bottom, a lower receptacle supported within said casing below the upper receptacle and in spaced relation thereto and having its upper part spaced from the lower end of said upper receptacle and affording a return current passage between it and said upper receptacle, means to cause such current to circulate through and around said upper receptacle and through the space between said receptacles, means within and adjustable vertically relatively to said lower receptacle to vary the space between said receptacles through which the current is permitted to circulate, and means for feeding material to be separated to said upper receptacle.

26. In combination, an outer casing enclosing a chamber, means therein for generating a fluid current, an upper receptacle supported within the chamber in spaced relation to said casing and having an open top and an open bottom, a fixed lower receptacle fixed below the upper receptacle and in spaced relation to said upper receptacle and affording a return current passage between said receptacles, an adjustable valve surrounding said upper receptacle and adjustable vertically downward inwardly of the outer edge of said lower receptacle for varying the space between said receptacles through which return current is permitted to circulate, and means for feeding material to be separated to said upper receptacle.

27. In combination, a casing enclosing a chamber, means therein for generating a fluid current, an upper receptacle supported within the chamber in spaced relation to said casing and having an open top and an open bottom, a lower receptacle supported below and having its upper end spaced from the lower end of the upper receptacle to afford a return current passage between them, an annular valve surrounding said upper receptacle within and adjustable downwardly toward said lower receptacle for varying the space between said receptacles through which return current is permitted to circulate, and means for feeding material to be separated to said upper receptacle.

28. In combination, a casing enclosing a chamber, means therein for generating a fluid current, an upper receptacle supported within the chamber in spaced relation to said casing and having an open top and an open bottom, a lower receptacle supported below and in spaced relation to said upper receptacle having an upper end spaced from said upper receptacle to afford a passage for return current between them, a cylindrical valve within said lower receptacle and adjustable vertically to vary the space between said receptacles through which such current is permitted to circulate, and means for feeding material to be separated to said upper receptacle.

29. In combination, an outer casing enclosing a chamber, means therein for generating a fluid current, an upper receptacle supported within the chamber in spaced relation to said casing and having an open top and an open bottom, a fixed lower receptacle supported below and in spaced relation to said upper receptacle to afford between them a return current passage and affording below the open bottom of said upper receptacle a tailings outlet for coarse material descending through said opening, a circular valve inwardly of and above said lower receptacle and adjustable vertically toward the latter to vary the space between said receptacles through which return current may flow, and means for feeding material to be separated to said upper receptacle.

30. In combination, an outer casing enclosing a chamber, means therein for generating a fluid current, an upper receptacle supported within the chamber in spaced relation to said casing and having an open top and an open bottom, a lower receptacle supported below and in spaced relation to said upper receptacle and affording between them a return current passage and affording below the open bottom of said upper receptacle an outlet for coarse material, an annular wall mounted in said chamber below said upper receptacle and extending downwardly therefrom and surrounding the space between said receptacles and affording an opening into said chamber exteriorly of said receptacles, means to cause a fluid current to circulate between said receptacles and through and around said upper receptacle and through said opening, a vertically adjustable valve above and adjustable toward said lower receptacle within said annular wall for varying the space between said receptacles through which said current is permitted to circulate, and means for feeding material to be separated to said upper receptacle.

31. In combination, an outer casing enclosing a chamber, means therein for generating a fluid current, an upper receptacle supported within the chamber in spaced relation to said casing and having an open top and an open bottom, a lower receptacle supported below and in spaced relation to said upper receptacle and affording between them a return current passage and affording below said lower opening an outlet for coarse material, a foraminous wall surrounding said return current passage for extracting floating material from the current flowing thereto from said chamber, a valve adjustable relatively to said lower receptacle and disposed inwardly of said wall for varying the space through which the current between said receptacles is permitted to flow, and means for feeding the material to be separated to said upper receptacle.

32. In combination, an outer casing enclosing a chamber, means therein for generating a fluid current, an upper receptacle supported within the chamber in spaced relation to said casing and having an open top and an open bottom, a lower receptacle supported below and in spaced relation to said upper receptacle and affording between them a return current passage and affording below said lower opening an outlet for coarse material, filtering means for extracting floating material from the return current surrounding said return passage below said upper receptacle and affording communication between said chamber and said return passage, means adjustable relatively to said lower receptacle and disposed inwardly of said filtering means for varying the space through which return current may pass to flow between said receptacles, means for causing a fluid current to flow through said upper receptacle and said passage, and means for feeding material to be separated to said upper receptacle.

33. In combination, an outer casing enclosing a chamber, means therein for generating a fluid current, an upper receptacle supported within the chamber and having an open top and a lower opening, a lower receptacle supported below and spaced apart from said upper receptacle and affording between them a return current passage and affording below said lower opening an outlet for coarse material, means for causing a fluid current to flow through said upper receptacle and return through said passage, an adjustable valve above said lower receptacle and surrounding the lower opening of said upper receptacle and adjustable vertically relatively to said receptacles to vary the space between them through which return current may flow, and means for feeding material to be separated to said upper receptacle.

34. In combination, a casing, means for distributing material therein, means therein for generating a fluid current, means for causing such current to flow therein, a chamber surrounding said means, means affording a tailings outlet below said distributor, means affording a return chamber below said chamber, a series of hollow sided extracting troughs between said chambers, means affording an annular conduit receiving the product from said troughs, means affording a separate conduit outwardly of and surrounding said conduit for the precipitate from said first mentioned chamber, and means affording a current conduit communicating with said return chamber inwardly of said annular conduit.

In witness whereof, I have hereunto signed my name.

GEORGE HOLT FRASER.